United States Patent

[11] 3,593,334

[72] Inventor Charles E. Bickel
Thousand Oaks, Calif.
[21] Appl. No 779,802
[22] Filed Nov. 29, 1968
[45] Patented July 13, 1971
[73] Assignee Burroughs Corporation
Detroit, Mich.

[54] PULSE DISCRIMINATION SYSTEM
20 Claims, 1 Drawing Fig.

[52] U.S. Cl. 340/174.1 H, 328/115
[51] Int. Cl. G11b 5/44, H03k 5/20
[50] Field of Search 340/174.1, 174.1 B, 174. H; 179/100.2 K; 328/115

[56] References Cited

UNITED STATES PATENTS

| | | | |
|---|---|---|---|
| 3,041,415 | 6/1962 | Gratizn | 179/100.2 |
| 3,430,215 | 2/1969 | Krossa | 340/174.1 |
| 2,807,797 | 9/1957 | Shoemaker | 179/100.2 |
| 2,816,162 | 12/1957 | Johnson | 179/100.2 |
| 3,381,083 | 4/1968 | Jensen et al. | 179/100.2 |
| 3,479,255 | 11/1968 | Parker et al | 340/174.1 |
| 3,465,321 | 9/1969 | Reisfeld | 340/174.1 |

*Primary Examiner*—Bernard Konick
*Assistant Examiner*—Vincent P. Canney
*Attorney*—Christie, Parker and Hale

ABSTRACT: Data pulses are discriminated from noise on an amplitude basis at an adjustable threshold level. The data pulses occur in groups separated from each other by intervals of time. The groups have different signal levels. The adjustable threshold level is set responsive to the peak amplitude of the first pulse of each group so as to select for each group the appropriate threshold level to discriminate the data pulses from noise. Preferably, the first pulse of each group is a control pulse separated from the remaining pulses of the group by several bit cells.

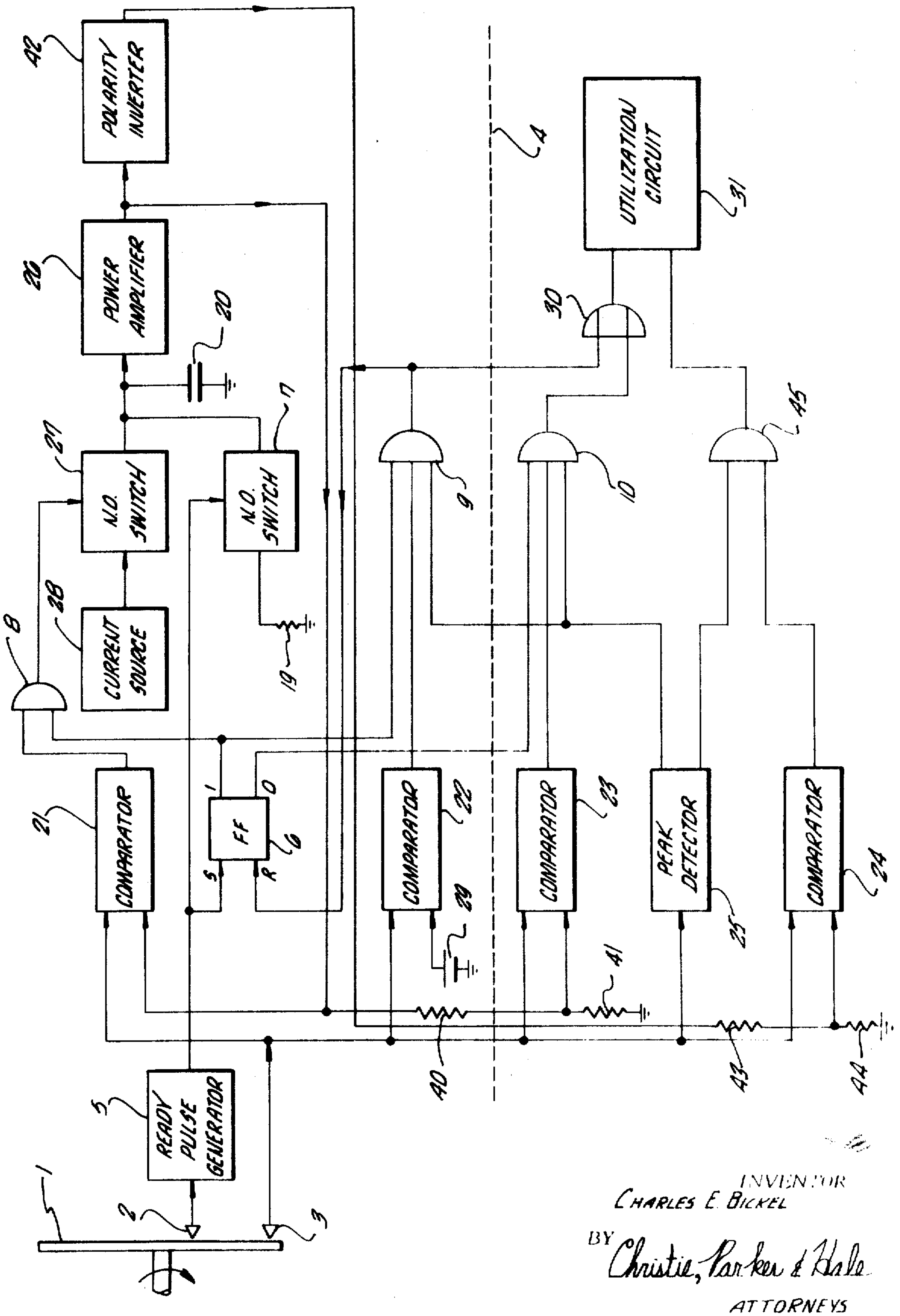
INVENTOR
CHARLES E. BICKEL
BY Christie, Parker & Hale
ATTORNEYS

PULSE DISCRIMINATION SYSTEM

BACKGROUND OF THE INVENTION

This invention relates to the discrimination of data pulses from noise and, more particularly, to data recovery circuitry that discriminates on an amplitude basis data pulses having widely different signal levels. The recovery of data from a magnetic disc file storage unit is one important field of use of the invention.

In recovering data from a storage medium or from the receiver terminal of a data transmission link, the data pulses are commonly distinguished from noise by amplitude discrimination. The data signal is applied to a threshold detector whose threshold level is set to transmit the peaks of the data pulses while rejecting noise. In many types of data systems, the signal level of the data pulses is subject to wide variation. For example, the signal level produced at the output of the magnetic readhead of a disc file storage unit may vary substantially due to the many variable factors that influence signal level. A few of these variable factors are the spacing between the heads and the disc, the characteristics of the heads, and the extraneous movements of the disc. The signal level may depend upon the location of the data on the disc, as well as other, unpredictable circumstances. Unfortunately, the effects of the variable factors seem to increase as new disc files are developed with higher storage capacities and faster access times. When binary data is stored at a high packing density on a magnetic storage medium, such as a disc file or tape, the pattern of the recovered data pulses, i.e., the presence or absence of pulses in the bit cells, influences the peak amplitude of the data pulses. In a series of data pulses that occur in successive bit cells, the first pulse has a larger peak amplitude than the remaining pulses and the remaining pulses vary in peak amplitude from pulse to pulse. This phenomenon is known as pulse crowding.

Variations in signal level and pulse crowding complicate the selection of an appropriate threshold level for amplitude discrimination. The approach taken in most data handling systems is simply to strive to reduce the variations in signal level and pulse crowding as much as possible and then to set the threshold level of the threshold detector at a constant value which is suitable for the whole range of pulse peak amplitudes that may be encountered. This practice often results in less than reliable discrimination of the data pulses from noise because the most appropriate threshold level for the peak amplitude of the data pulses in view of the noise level at the moment is often not being employed.

To meet the problem of variations in signal level of the data pulses, a variable gain amplifier has been employed in some prior art systems. The data pulses are coupled through the amplifier to the input of the threshold detector, and the gain of the amplifier is automatically adjusted to hold the signal level at its output constant. The fact that the gain of the amplifier is subject to change in the course of the recovery of the data pulses gives rise to distortion of the data pulses and requires a finite recovery time for the transients generated in the amplifier to subside.

To meet the problem of pulse crowding, it has been suggested that circuitry be provided for discriminating data pulses on two different amplitude bases. Depending upon the pulse pattern at the moment, the data pulses are discriminated on one basis or the other. A patent application of Michael I. Behr and John A. Hibner, Ser. No. 658,489, filed Aug. 4, 1967 (which matured into U.S. Pat. No. 3,559,178 on Jan. 26, 1971), and a U.S. Pat. application of Charles E. Bickel, Ser. No. 756,562, filed Aug. 30, 1968, both assigned to the assignee of the present application, deal with pulse crowding in this way.

SUMMARY OF THE INVENTION

The invention contemplates a pulse discrimination system for a source of data pulses the occur in groups separated from each other by intervals of time. The pulse groups have different signal levels. The first pulse of each group of data pulses is indicative of the particular signal level of that group and controls the threshold level of an amplitude discriminator. Preferably, the threshold level is controllable over a continuous range. Consequently, the first pulse of each group of data pulses serves to establish a threshold level in the discriminator that is appropriate for the signal level of that group of data pulses so reliable recovery of all the data can be achieved despite variations in signal level from group to group.

In part the invention is based upon the recognition that the peak amplitude of the first pulse in groups of data pulses separated from each other by intervals of times is relatively unaffected by pulse crowding and, therefore, accurately represents the signal level of the data pulses in the group that follows. The data pulses are discriminated at an adjustable threshold level that is set responsive to the peak amplitude of the first pulse of each group. Preferably, the first pulse of each group is a control pulse that is separated from the remaining data pulses of the group by one or more bit cells and has no significance as data except to set the threshold level.

In a preferred embodiment, a control signal proportional in amplitude to the peak amplitude of the first pulse is generated and the amplitude discriminator is enabled responsive to the control signal to discriminate the remaining pulses from noise. Preferably, the discriminator comprises a comparator having first and second inputs and an output that gives an indication when the signal on the first input exceeds the signal on the second input. The first input of the comparator is connected to a source of data pulses and the second input of the comparator is connected to a source of reference signals having an amplitude that varies in direct relationship to the signal level of the data pulses. As the amplitude of the reference signal varies, the threshold level for the data pulses also varies.

BRIEF DESCRIPTION OF THE DRAWING

The features of a specific embodiment of the best mode contemplated of carrying out the invention are illustrated in the drawing, the single FIGURE of which is schematic diagram partially in block form of a disc file unit and data recovery circuitry that incorporates the principles of the invention.

DETAILED DESCRIPTION OF A SPECIFIC EMBODIMENT

In the drawing, a disc file unit 1 is shown that rotates in spaced relationship from readheads 2 and 3. For the purposes of illustration, it is assumed that the magnetic surface of disc file 1 is divided into a plurality of concentric zones as described in U.S. Pat. No. 3,375,507 of R. A Gleim et al., issued Mar. 26, 1968. As described in the Gleim et al. patent, several of the zones are reserved for the storage of data in a plurality of tracks and one of the zones is reserved for a clock track and an address track. The data, clock pulses, and addresses are recorded on the disc in binary form as flux reversals. The data in each data track of the disc is distributed around the disc in groups so that, as the disc rotates at a constant speed, readhead 3 produces groups of data pulses separated from each other by intervals of time. Each group can be considered to be made up of a number of bit cells, the presence and absence of pulses in the bit cells determining the stored data. In actuality, a separate readhead would preferably be employed for each data track, and only the readhead for the data track being read, which is represented by readhead 3, would be coupled to the data recovery circuitry. Addresses are recorded on the address track to identify the locations on the data tracks where groups of data are recorded. Special designations, called a word mark in the Gleim et al. patent, are recorded at the beginning of the addresses. Thus, a word mark is located in the address track in a predetermined physical relationship to each group of data on the disc. A readhead 2 senses the word marks on the address track slightly before readhead 3 senses the corresponding groups of data. The circuitry for addressing the data stored on the disc, selecting the readhead corresponding to the proper data track, and generating timing pulses from the clock track is conventional and, therefore, is not represented in the drawing.

The circuitry lying below dashed line 4 discriminates the data pulses produced by readhead 3 from noise and the circuitry lying above dashed line 4 sets the threshold level at which pulse discrimination takes place. A ready pulse generator 5 whose input is coupled to readhead 2 is actuated each time readhead 2 senses a word mark in the address track. Accordingly, a ready pulse of fixed duration and positive potential is produced by generator 5 slightly before readhead 3 begins to produce a group of data pulses. The output of generator 5 is coupled to the S input of a flip-flop 6 and the control input of a normally open switch 7. When a positive potential is applied to the S input of flip-flop 6, it becomes set, its "1" output assuming a positive potential and its "0" output assuming ground potential. The "1" output of flip-flop 6 is connected to one input of an AND gate 8 and one input of an AND gate 9. The "0" output of flip-flop 6 is connected to one input of an AND gate 10. One terminal of a capacitor 20 is grounded and its other terminal is coupled through normally open switch 7 and a resistor 19 to ground. Switch 7 is closed while the potential on its control input is positive. The leading edge of the ready pulse sets flip-flop 6 so as to enable AND gates 8 and 9 and disable AND gate 10. The ready pulse also closes switch 7 to discharge capacitor 20 through resistor 19. The duration of the ready pulse is sufficient to keep switch 7 closed until capacitor 20 is completely discharged.

At the beginning of each group of data stored in the data tracks on disc file 1, a binary value "1" is recorded from which readhead 3 produces a positive potential control pulse to set the adjustable threshold level for the pulse discrimination circuitry. This control pulse has no significance as data except to set the threshold level and is spaced several bit cells from the remaining data pulses of the group. For example, the spacing between the leading edge of the ready pulse and the control pulse could be in the order of eight bit cells, the duration of the ready pulse could be in the order of four bit cells, and the spacing between the control pulse and the remaining data pulses of the group could be in the order of two bit cells. By virtue of the separation of the control pulse from the remaining data pulses of the group, it is virtually unaffected by the effects of pulse crowding so its peak amplitude is an accurate indication of the signal level of the data pulses following it.

Readhead 3 is connected to a signal input of comparators 21, 22, 23, and 24, and to the input of a peak detector 25. Comparators 21 through 24 also have a reference input and a binary output that assumes a positive potential when the signal input exceeds the reference input and assumes ground potential when the reference input exceeds the signal input. The voltage appearing across capacitor 20 is coupled to the input of a power amplifier 26 whose output is fed back to the reference input of comparator 21. The output of comparator 21 is connected to the other input of AND gate 8. .The output of AND gate 8 is coupled to the control input of a normally open switch 27 that is connected in series between a current source 28 and capacitor 20. When a control pulse is produced by readhead 3 after a ready pulse has prepared the threshold level setting circuitry as described above, the signal input of comparator 21 initially exceeds the reference input because capacitor 20 is in a completely discharged condition. Thus, the output of comparator 21 assumes a positive potential. Since the "1" output of flip-flop 6 is also at a positive potential, the output of AND gate 8 is at a positive potential and switch 27 is closed. Accordingly, capacitor 20 is charged by current source 28 so the potential at the input of power amplifier 29 becomes positive, and the amplitude of the potential at the output of power amplifier 26 follows the amplitude of the control pulse as it rises. If capacitor 20 charges too fast relative to the rise of the control pulse, comparator 21 closes switch 27 to let the control pulse catch up, so to speak, with capacitor 20.

Peak detector 25 is a conventional circuit that produces a positive potential pulse of short duration on a first output when a positive peak is sensed at its input and a positive potential pulse of short duration on a second output when a negative peak is sensed at its input. The first output of peak detector 25 is connected to inputs of AND gates 9 and 10. The reference input of comparator 22 is connected to a signal source 29 of constant amplitude such as a battery. The output of comparator 22 is connected to another input of AND gate 9. The output of AND gate 9 is coupled directly to the R input of flip-flop 6, and through an OR gate 30 to a utilization circuit 31. As previously explained, the "1" output of flip-flop 6 is placed at a positive potential by the ready pulse; the output of comparator 22 assumes a positive potential when the control pulse exceeds a threshold level which is determined by the constant amplitude of source 29; and the first output of peak detector 25 assumes a positive potential when the peak of the control pulse is sensed. At such time, the output of AND gate 9 assumes a positive potential to reset flip-flop 6 so its "0" output assumes a positive potential and its "1" output assumes ground potential. Thus, AND gates 8 and 9 become disabled, and AND gate 10 becomes enabled. When flip-flop 6 is reset, switch 27 opens once again and the voltage appearing across capacitor 20 is held. At this point a threshold level that is appropriate for the signal level of the group of data pulses about to be produced by readhead 3 has been established, and the pulse discrimination circuitry is ready to receive the remaining data pulses of the group.

The output of power amplifier 26, which is at a positive potential, is coupled through a voltage divider comprising resistors 40 and 41 to the reference input of comparator 23. The output of power amplifier 26 is also coupled to the input of a polarity inverter 42, which could simply be an amplifier having unity gain and a polarity inversion. The output of polarity inverter 42, which is at a negative potential, is coupled through a voltage divider comprising resistors 43 and 44 to the reference input of comparator 24. The resistance ratio of resistors 40 and 41 and resistors 43 and 44 determines the fraction of the peak amplitude of the control pulse at which the threshold level is to be set for discrimination. Each time a positive data pulse is produced by readhead 3, the output of comparator 23 assumes a positive potential when the data pulse exceeds the positive threshold level. Upon the subsequent occurrence of the positive peak of the data pulse, the pulse produced by peak detector 25 is coupled through AND gate 10 and OR gate 30 to utilization circuit 31. Each time a negative data pulse is produced by readhead 33, the output of comparator 24 assumes a positive potential when the data pulse exceeds the negative threshold level. The output of comparator 24 and the second output of peak detector 25 are connected to the inputs of an AND gate 45. The output of AND gate 45 is coupled to utilization circuit 31. Upon the subsequent occurrence of the negative peak of the data pulse, the pulse produced by peak detector 25 is coupled through AND gate 45 to utilization circuit 31. The exact nature of utilization circuit 31 depends upon the form in which information is recorded on disc file 1. Assuming that the information is recorded in conventional nonreturn to zero form, i.e., one polarity of flux in a bit cell on disc file 1 is a binary "1" and the other polarity of flux in a bit cell is a binary "0", utilization circuit 31 could be a flip-flop whose S input is connected to OR gate 30 and whose R input is connected to AND gate 45.

The invention can be used in conjunction with the circuitry disclosed in the above-mentioned copending applications for detector the adverse effects of pulse crowding. In copending application Ser. No. 658,489 base clippers 25 and 36 could be comparators whose reference inputs are fed by power amplifier 26 through voltage dividers with different resistance ratios. Similarly, base clippers 27 and 38 could be comparators whose reference inputs are fed by polarity inverter 42 through voltage dividers with different resistance ratios. In copending application Ser. No. 756,562 threshold detector 3 could be a comparator whose reference input is fed by power amplifier 26 and threshold detector 5 could be a comparator whose reference input is fed by polarity inverter 42. By utilizing the invention in this way, variations in the signal level and pulse crowding can both be combated at the same time.

Instead of employing a control pulse that has no significance as data except to set the threshold level, in some instances the first pulse of a group of data pulses that has significance as data could be employed. In such case, the pulse used to set the threshold level may possibly be as close as one bit cell from the data pulse next to it in the group, depending upon the pulse pattern. Even if this does occur, a reasonably good indication of the signal level can be obtained because the first pulse of a series of pulses in successive bit cells is less subject to the effects of pulse crowding than the following pulses.

In the broader aspects of the invention, the control pulse could indicate the signal level of the groups of data pulses in other ways than by its amplitude. For example, if the invention is employed in a system where the signal level of the group of data pulses is known in advance, one or more control pulses associated with each group of data pulses could represent the signal level in pulse code modulation or in pulse width modulation. In such case a decoder would be required to convert the modulated control pulses to an analog threshold level.

What I claim is:

1. A pulse discrimination system comprising: a source of data pulses occurring in groups separated from each other by intervals of time, the first pulse of each group being indicative in peak amplitude of the signal level of the other pulses in the group, and the pulses in different groups being subject to variations in their signal levels;

means for amplitude discriminating the data pulses from noise at an adjustable threshold level; and means responsive to the peak amplitude of the first pulse of each group for setting the adjustable threshold level of the amplitude discriminating means at a value directly related to the peak amplitude of the first pulse so as to enable the data pulses of each group to be discriminated from noise.

2. The pulse discrimination system of claim 1, in which the first pulse of each group is a control pulse that is separated from the remaining pulses of the group by an interval of time, the only significance of the control pulse as data being to set the threshold level.

3. The pulse discrimination system of claim 1, in which the threshold level of the discriminating means is adjustable over a continuous range.

4. The pulse discrimination system of claim 1, in which the threshold level is set at a value proportional to the peak amplitude of the first pulse of each group.

5. The pulse discrimination system of claim 1, in which the discriminating means comprises a comparator having first and second inputs and an output that gives an indication when the signal on the first input exceeds the signal on the second input; and the threshold level setting means comprises a capacitor, means responsive to the difference between the amplitude of the voltage across the capacitor and the amplitude of the first pulse of each group for charging the capacitor during intervals of time in which the first pulse occurs, means for holding the voltage across the capacitor during intervals of time in which the remaining pulses of each group occur, and means for coupling the capacitor to the second input of the comparator during intervals of time in which the remaining pulses of each group occur.

6. The pulse discrimination system of claim 1, in which the source of data pulses comprises a magnetic disc file storage medium on which the data is stored in the form of spatially distributed magnetic flux variations, the flux variations corresponding to each group of data pulses being located in close physical proximity to each other on the storage medium, and a transducer for converting the flux variations to electrical pulses.

7. The pulse discrimination system of claim 6, in which the data is represented on the storage medium as binary flux reversals, the threshold level setting means produces an electrical signal proportional to the peak amplitude of the first pulse of each group, and the means for discriminating the data pulses comprises a peak detector that gives an indication of the occurrence of the peaks of a signal applied to its input; means for connecting the output of the transducer to the input of the peak detector; a comparator having first and second inputs and an output that gives an indication when the signal on the first input exceeds the signal on the second input; means for connecting the output of the transducer to the first input of the comparator; means for connecting the threshold level setting means to the second input of the comparator; and means responsive to the coincidence of an indication from the comparator and an indication from the peak detector for producing an indication of the occurrence of a data pulse.

8. The pulse discrimination system of claim 7, in which the threshold level setting means comprises a capacitor, means responsive to the difference between the amplitude of the voltage across the capacitor and the amplitude of the first pulse of each group for charging the capacitor during intervals of time in which the first pulse occurs, means for holding the voltage across the capacitor during intervals of time in which the remaining pulses of each group occur, and means for coupling the capacitor to the second input of the comparator during intervals of time in which the remaining pulses occur.

9. The pulse discrimination system of claim 8, in which a bistable device is provided having first and second stable states, the capacitor charging means being operative when the bistable device is in the first state and the capacitor holding being operative when the bistable device is in the second state, means are provided for setting the bistable device in the first state prior to the occurrence of the first pulse of each group, and means are provided for resetting the bistable device in the second state after the occurrence of the first pulse of each group.

10. The pulse discrimination system of claim 9, in which the means for setting the bistable device in the first state comprises magnetic flux variations recorded on the storage medium in a definite predetermined location relative to the flux variations corresponding to the groups of data pulses and a transducer for converting the flux variations to electrical pulses.

11. The pulse discrimination system of claim 10, in which the means for resetting the bistable device in the second state comprises a reset comparator having first and second inputs and an output that gives an indication when the signal on the first input exceeds the signal on the second input, means for connecting the output of the transducer to the first input of the reset comparator, a signal source having a constant amplitude connected to the second input of the reset comparator, and means responsive to the coincidence of an indication from the reset comparator and an indication from the peak detector for producing a reset signal for the bistable device.

12. A pulse discrimination system comprising:

a source of data pulse signals occurring in groups separated from each other by intervals of time, the data pulse signals of each group having substantially the same signal level, and the data pulse signals of different groups being subject to variations in their signal levels;

a source of control pulse signals respectively associated with the groups of data pulse signals, each control pulse signal occurring in the interval of time preceding the associated group of data pulse signals, and each control pulse signal being representative of the signal level of the data pulse signals of the associated group;

means coupled to the source of data pulse signals for indicating those portions of the data pulse signals that exceed a controllable threshold level; and means responsive to the control pulse signal associated with each group of data pulse signals for controlling the threshold level of the indicating means in accordance with the signal level represented by such control pulse signal.

13. The pulse discrimination system of claim 12, in which the threshold level is controllable over a continuous range.

14. The pulse discrimination system of claim 13, in which the source of data pulses and the source of control pulses are spatially distributed magnetic flux reversals on a magnetic storage medium, the flux reversals of each group of data pulses and its control pulse being located in close physical proximity to each other, and transducing means for converting the flux reversals to electrical pulses.

15. The pulse discrimination system of claim 14, in which the data is represented by the presence and absence of data pulses in successive bit cells and the control pulses are separated from the groups of data pulses to which they relate by at least one bit cell.

16. A pulse discrimination system comprising:

a source of binary data pulses to be discriminated from noise, the data pulses occurring in groups separated from each other by intervals of time, the first pulse of each group being indicative in peak amplitude of the signal level of the other pulses in the group, and the pulses in different groups being subject to variations in their signal levels;

a peak detector that gives an indication of the occurrence of the peaks of a signal applied to its input;

means for connecting the source to the input of the peak detector;

a comparator having first and second inputs and an output that gives an indication when the signal on the first input exceeds the signal on the second input;

means for connecting the source of data pulses to the first input of the comparator;

a source of reference signals that vary as a function of the signal level of the data pulses;

means for connecting the source of reference signals to the second input of the comparator; and means responsive to the coincidence of an indication from the comparator and an indication from the peak detector for producing an indication of the occurrence of a data pulse.

17. A pulse discrimination system comprising:

a source of data pulses to be discriminated from noise, the data pulses occurring in groups separated from each other by intervals of time, the first pulse of each group being indicative in peak amplitude of the signal level of the other pulses in the group, and the pulses in different groups being subject to variations in their signal levels;

a comparator having first and second inputs and an output that gives an indication when the signal on the first input exceeds the signal on the second input;

means for connecting the source to the first input;

a source of reference signals the amplitude of which varies in direct relationship to the signal level of the data pulses;

means for connecting the source of reference signals to the second input of the comparator; and a utilization circuit connected to the output of the comparator.

18. A pulse discrimination system comprising:

a source of data pulses occurring in groups separated from each other by intervals of time, the data pulses of each group having substantially the same signal level and the data pulses of different groups being subject to variations in their signal levels;

a source of control pulses respectively associated with the groups of data pulses, each control pulse occurring in the interval of time preceding the associated group of data pulses, and each control pulse having a signal level indicative of the signal level of the data pulses of the associated group;

means for amplitude discriminating the data pulses from noise;

means for generating a control signal proportional in amplitude to the peak amplitude of the control pulses; and means responsive to the control signal for enabling the amplitude discriminating means to discriminate the data pulses of the group associated with each control pulse from noise.

19. The pulse discrimination system of claim 18, wherein the amplitude discriminating means has an adjustable threshold level above which data pulses are discriminated from noise; and wherein the means for enabling the amplitude discriminating means includes means responsive to the peak amplitude of each control pulse for setting the adjustable threshold level at a value so as to enable the data pulses of each group to be discriminated from noise.

20. A data storage system comprising:

a magnetic storage medium on which data is stored in groups;

means for reading the data stored on the storage medium as relative motion takes place between the storage medium and the reading means, the reading means producing an output signal in which the first data pulse of each group is indicative in peak amplitude of the signal level of the other data pulses in the group and the data pulses in different groups are subject to variations in their signal levels;

means for amplitude discriminating the output signal from the reading means such that a data pulse is indicated when the output signal exceeds a particular value; and means responsive to the peak amplitude of the first data pulse of each group for changing the particular value in direct relationship to the peak amplitude of such first data pulse so as to amplitude discriminate the output signal as the different groups are read by the reading means.

PO-1050
(5/69)

UNITED STATES PATENT OFFICE
CERTIFICATE OF CORRECTION

Patent No. 3,593,334 Dated July 13, 1971

Inventor(s) Charles E. Bickel

It is certified that error appears in the above-identified patent and that said Letters Patent are hereby corrected as shown below:

Patent column 1, line 75, "the" should be --that--.

Patent column 2, line 14, "times" should be --time--; line 41, --a-- should be inserted after "is".

Patent column 4, line 67, "detector" should be --reducing--.

Patent column 6, line 30, --means-- should be inserted after "holding".

Signed and sealed this 4th day of July 1972.

(SEAL)
Attest:

EDWARD M.FLETCHER,JR.
Attesting Officer

ROBERT GOTTSCHALK
Commissioner of Patents